(12) United States Patent
Yoshida

(10) Patent No.: US 8,736,739 B2
(45) Date of Patent: May 27, 2014

(54) IMAGING APPARATUS, IMAGING CONTROL METHOD, AND PROGRAM

(75) Inventor: Takuji Yoshida, Chiba (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 13/324,449

(22) Filed: Dec. 13, 2011

(65) Prior Publication Data

US 2012/0194705 A1 Aug. 2, 2012

(30) Foreign Application Priority Data

Jan. 27, 2011 (JP) ................................. 2011-014939

(51) Int. Cl.
*H04N 5/225* (2006.01)

(52) U.S. Cl.
USPC ............................. 348/339; 348/335; 348/236

(58) Field of Classification Search
CPC .................................................. H04N 5/2259
USPC ......... 348/234, 236, 238, 335, 336, 338, 339; 359/726
See application file for complete search history.

(56) References Cited

U.S. PATENT DOCUMENTS

| 4,107,732 | A | * | 8/1978 | Adcock et al. | 348/238 |
| 4,823,186 | A | * | 4/1989 | Muramatsu | 348/236 |
| 5,978,023 | A | * | 11/1999 | Glenn | 348/234 |

FOREIGN PATENT DOCUMENTS

JP 2007-97098 4/2007

* cited by examiner

*Primary Examiner* — Tuan Ho

(74) *Attorney, Agent, or Firm* — Oblon, Spivak, McClelland, Maier & Neustadt, L.L.P.

(57) ABSTRACT

An imaging apparatus includes: a half-silvered mirror that divides incident light from a subject into light fluxes traveling along two optical paths; a first imaging device that receives one of the incident light fluxes divided by the half-silvered mirror; a second imaging device that receives the other one of the incident light fluxes divided by the half-silvered mirror; a first subject luminance information calculator that calculates first subject luminance information based on an output from the first imaging device; a second subject luminance information calculator that calculates second subject luminance information based on an output from the second imaging device; and a subject luminance information comparator that compares the first subject luminance information with the second subject luminance information.

13 Claims, 13 Drawing Sheets

BRIGHTER

IMAGING APPARATUS, IMAGING CONTROL METHOD, AND PROGRAM

FIELD

The present technique relates to an imaging apparatus, an imaging control method, and a program, and particularly to an imaging apparatus, an imaging control method, and a program that can reduce the difference in brightness between images produced by two imaging devices on which polarized light from a subject is incident.

BACKGROUND

There is an imaging apparatus including two imaging devices, one for displaying live-view images and the other for capturing a still image, and so configured that light from a subject is divided by a half-silvered mirror to the imaging device for displaying live-view images and the imaging device for capturing a still image (see JP-A-2007-97098, for example).

SUMMARY

The thus configured imaging apparatus of related art, however, has the following problem when light incident on the imaging apparatus is polarized: For example, when an image of (an image displayed on) a liquid crystal screen, a water surface, or any other similar subject is captured and the reflected light is incident on the imaging apparatus.

FIGS. 1A and 1B describe the relationship between difference in reflectance and difference in polarization state.

Consider p-polarized light, the polarization direction of which is parallel to a plane of incidence 2, and s-polarized light, the polarization direction of which is perpendicular to the plane of incidence 2, are incident on a glass surface 1 at a predetermined angle of incidence, as shown in FIG. 1A. FIG. 1B shows the relationship between the angle of incidence and reflectance.

The reflectance for the s-polarized light increases as the angle of incidence increases, whereas the reflectance for the p-polarized light gradually decreases as the angle of incidence increases and reaches zero at a certain angle of incidence. The angle at which the reflectance becomes zero is typically called Brewster's angle. The reflectance increases with the angle of incidence of the p-polarized light beyond Brewster's angle. On the other hand, the reflectance for natural light, the polarization direction of which is not fixed, is greater than the reflectance for the p-polarized light but smaller than the reflectance for the s-polarized light.

For example, consider a situation where the imaging apparatus of related art described above is used to capture an image of a liquid crystal screen on which an image is displayed in such a way that the entire image displayed on the liquid crystal screen occupies the field of view, as shown in FIG. 2A. It is assumed that p-polarized light is reflected off the liquid crystal screen, which is a subject, and incident on the imaging apparatus. It is further assumed that the incident light reflected off the half-silvered mirror is incident on the imaging device for displaying live-view images, and that the incident light passing through the half-silvered mirror is incident on the imaging device for capturing a still image.

As described with reference to FIG. 1B, the reflectance for the p-polarized light decreases as the angle of incidence thereof approaches Brewster's angle. When the incident light is p-polarized light, the amount of light directed to the imaging device for displaying live-view images is therefore smaller than in a case where the incident light is natural light.

When exposure control is so performed that an exposure value determined by using the imaging device for displaying live-view images is also used for the imaging device for a capturing still image, the exposure value for capturing a still image is determined based on an image captured by using light the amount of which is smaller than that of natural light. As a result, a still image captured with the imaging device for a capturing still image is overexposed, as shown in FIG. 2B. That is, the still image captured with the imaging device for capturing a still image shown in FIG. 2B is disadvantageously brighter than live-view images captured with the imaging device for displaying live-view images.

Live-view images and a still image are desirably so captured that they have the same brightness in the first place. The imaging apparatus of related art, however, suffers from difference in brightness (luminance) between live-view images and a still image when the incident light is polarized, as described above.

Thus, it is desirable to reduce the difference in brightness between images captured with two imaging devices when incident light from a subject is polarized.

An imaging apparatus according to one embodiment of the present technique includes a half-silvered mirror that divides incident light from a subject into light fluxes traveling along two optical paths, a first imaging device that receives one of the incident light fluxes divided by the half-silvered mirror, a second imaging device that receives the other one of the incident light fluxes divided by the half-silvered mirror, a first subject luminance information calculator that calculates first subject luminance information based on an output from the first imaging device, a second subject luminance information calculator that calculates second subject luminance information based on an output from the second imaging device, and a subject luminance information comparator that compares the first subject luminance information with the second subject luminance information.

An imaging control method according to one embodiment of the present technique is used with an imaging apparatus including a half-silvered mirror that divides incident light from a subject into light fluxes traveling along two optical paths, a first imaging device that receives one of the incident light fluxes divided by the half-silvered mirror, and a second imaging device that receives the other one of the incident light fluxes divided by the half-silvered mirror. The method includes calculating first subject luminance information based on an output from the first imaging device by using a first subject luminance information calculator, calculating second subject luminance information based on an output from the second imaging device by using a second subject luminance information calculator, and comparing the first subject luminance information with the second subject luminance information by using a subject luminance information comparator.

A program according to one embodiment of the present technique instructs a computer to function as a first subject luminance information calculator that calculates first subject luminance information based on an output from a first imaging device that receives part of incident light from a subject, one of the incident light fluxes divided by a half-silvered mirror that divides the incident light into light fluxes traveling along two optical paths, a second subject luminance information calculator that calculates second subject luminance information based on an output from a second imaging device that receives the other one of the divided incident light fluxes, and a subject luminance information comparator that compares the first subject luminance information with the second subject luminance information.

In the embodiments of the present technique, incident light from a subject is divided with a half-silvered mirror into light fluxes traveling along two optical paths. First subject luminance information is calculated based on an output from a first imaging device that receives one of the divided incident light fluxes. Second subject luminance information is calculated based on an output from a second imaging device that receives the other one of the divided incident light fluxes. The first subject luminance information is compared with the second subject luminance information.

The program can be provided by transferring it via a transfer medium or recording it on a recording medium.

The imaging apparatus may be an independent apparatus or an internal block that forms a single apparatus.

According to one embodiment of the present technique, the difference in brightness between images captured with two imaging devices can be suppressed when incident light from a subject is polarized.

DETAILED DESCRIPTION

Example of Configuration of Imaging Apparatus

Figure 3:
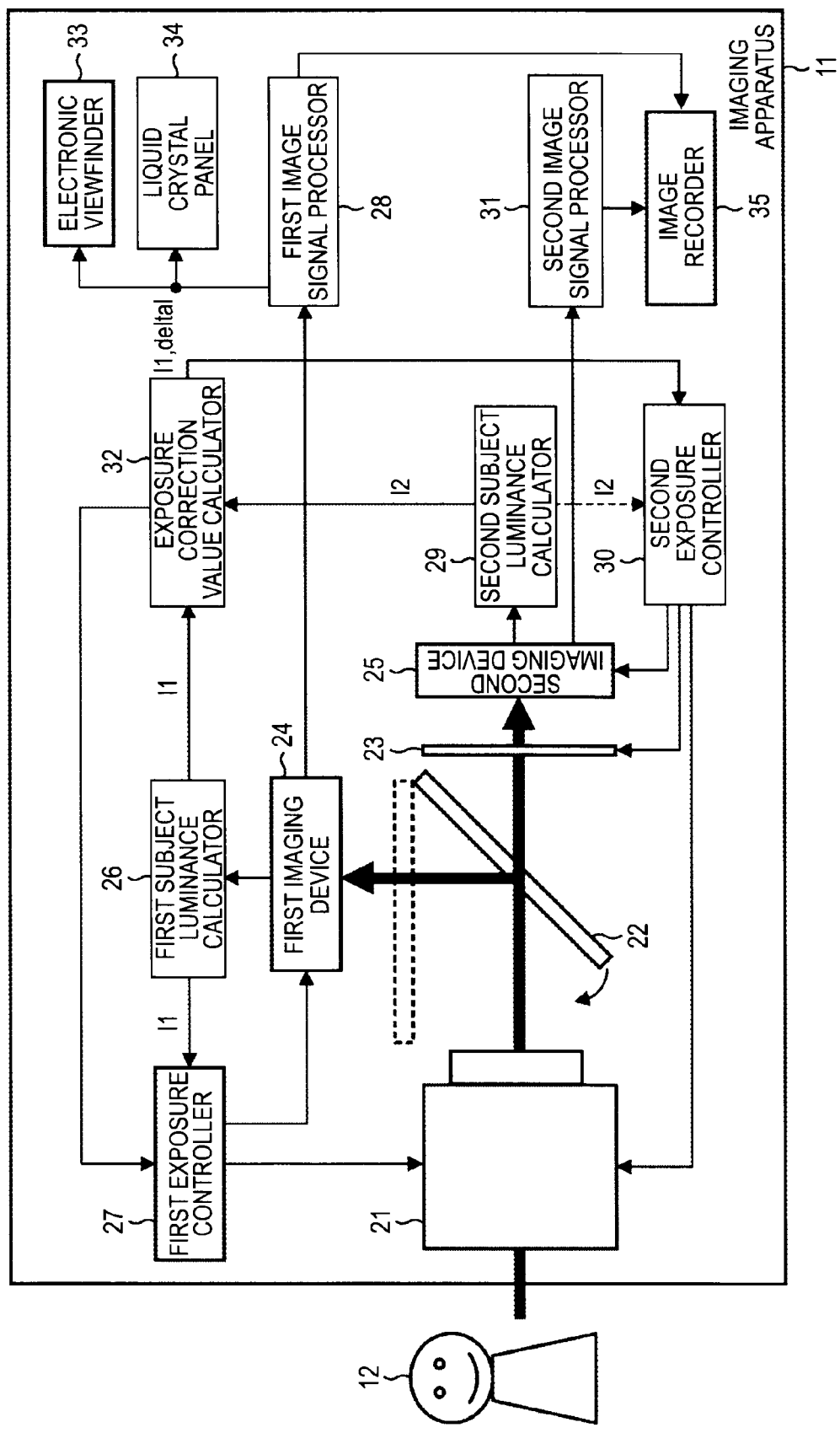
FIG. 3 is a block diagram showing an example of the configuration of an imaging apparatus according to an embodiment to which the present technique is applied.

FIG. 3 is a block diagram showing an example of the configuration of an imaging apparatus according to an embodiment to which the present technique is applied.

An imaging apparatus 11 includes an optical lens unit 21, a half-silvered mirror 22, a mechanical shutter 23, a first imaging device 24, and a second imaging device 25.

Figure 1A:
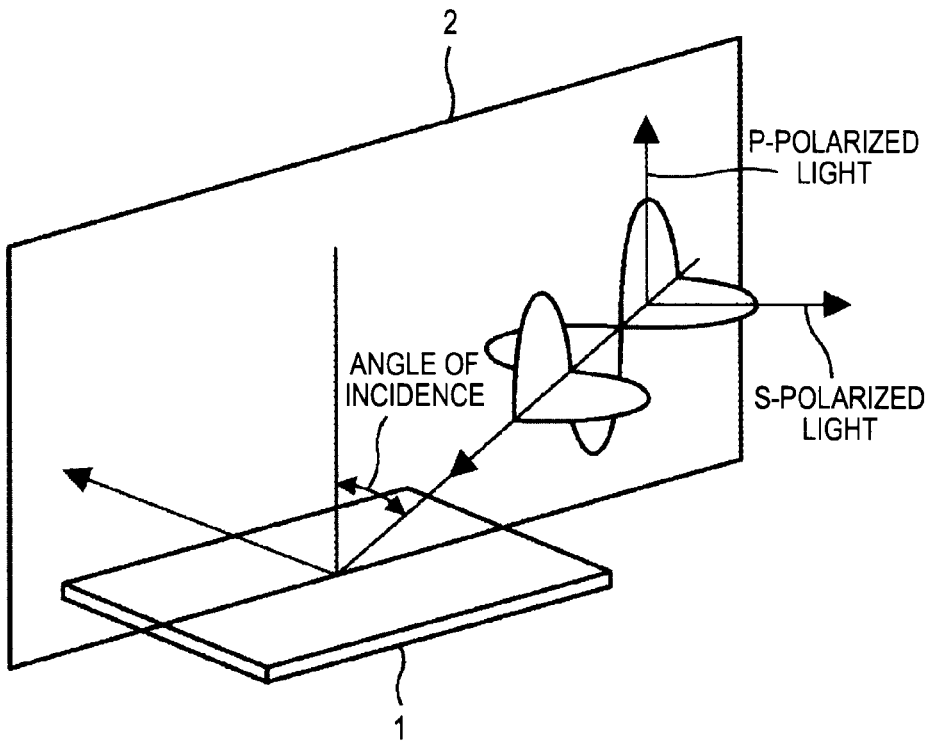
FIGS. 1A and 1B describe the relationship between difference in reflectance and difference in polarization state.
Figure 1B:
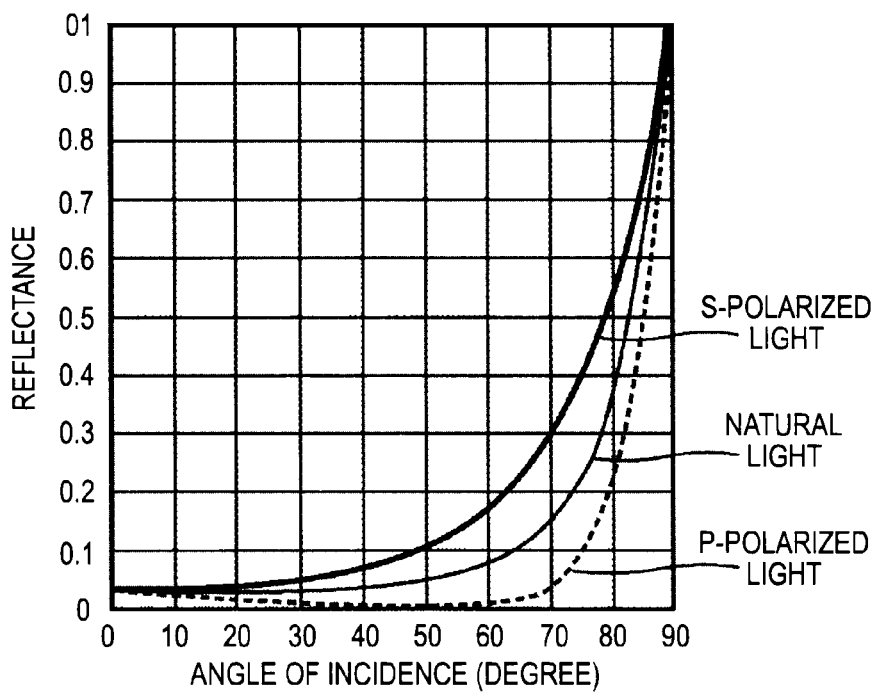

Light reflected off a subject 12 passes through the optical lens unit 21 and impinges on the half-silvered mirror 22. The half-silvered mirror 22 divides the light incident thereon into reflected light and transmitted light that travel along respective optical paths. The ratio of the amount of reflected light to the amount of transmitted light is one. That is, one-half the light reflected off the subject 12 is reflected off the half-silvered mirror 22 and received by the first imaging device, and the remaining other one-half passes through the half-silvered mirror 22 and is received by the second imaging device 25. The half-silvered mirror 22 is a dielectric multilayer film mirror having a dielectric multilayer film coated thereon and reflects p-polarized light and s-polarized light differently in terms of reflectance, as described with reference to FIG. 1B.

The half-silvered mirror 22 may be fixed or movable as indicated by the arrow in FIG. 3. When the half-silvered mirror 22 is movable, the light from the subject 12 can be incident on the second imaging device 25 without passing through the half-silvered mirror 22. The half-silvered mirror 22 may alternatively be configured differently in such a way that the ratio of the amount of reflected light to the amount of transmitted light is a predetermined value other than one.

Each of the first imaging device 24 and the second imaging device 25 converts light received in a predetermined exposure period into an electric signal in a photoelectric conversion process and outputs the electric signal. The first imaging device 24 is an imaging device for displaying live-view images, and the second imaging device 25 is an imaging device for capturing a still image. The first imaging device 24 and the second imaging device 25 do not necessarily have configurations and roles described above but may, for example, be configured conversely or have converse roles.

Each of the first imaging device 24 and the second imaging device 25 operates in a variety of output modes, not only a full-pixel output mode but also a thinning output mode in which the full pixels are thinned by a predetermined number of pixels, a local output mode in which only part of the full area is selected and outputted, and other output modes. The number of pixels of the first imaging device 24 may be equal to or different from that of the second imaging device 25. When the number of pixels of the first imaging device 24 differs from that of the second imaging device 25, the number of pixels of the first imaging device 24, which is used to capture live-view images, is typically smaller than the number of pixels of the second imaging device 25. When the number of pixels of the first imaging device 24 is smaller than that of the second imaging device 25, the first imaging device 24 may not perform the pixel thinning or pixel summing.

Figure 4:
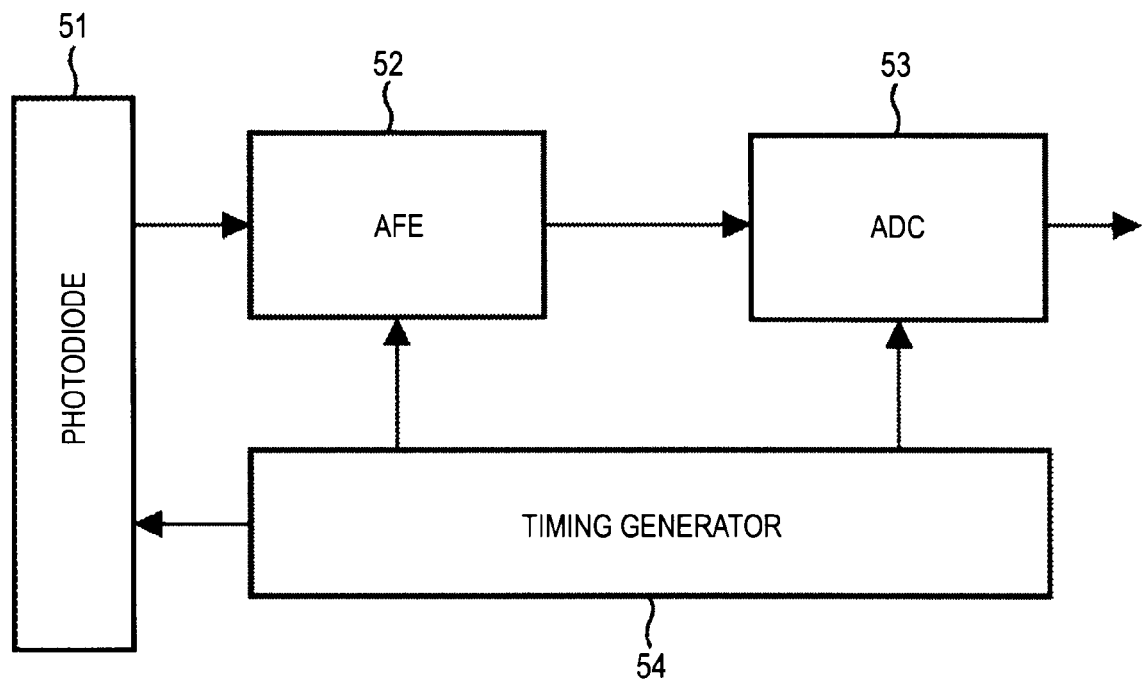
FIG. 4 is a block diagram showing an example of a detailed configuration of an imaging device.

FIG. 4 shows an example of a detailed configuration of an imaging device used as the first imaging device 24 and the second imaging device 25.

The imaging device includes a photodiode 51, an AFE 52, an ADC 53, and a timing generator 54.

The photodiode 51 converts an optical signal from each pixel into an electric signal (pixel signal) in a photoelectric conversion process and supplies the electric signal to the AFE 52. The AFE 52 performs predetermined signal processing, such as amplification of the electric signal from the photodiode 51 and reduction in noise contained in the electric signal. The ADC 53 converts the resultant analog pixel signal outputted from the AFE 52 into a digital signal and outputs it. The timing generator 54 supplies timing signals based on a master clock to the photodiode 51, the AFE 52, and the ADC 53 to control the timings at which these components operate. For example, the timing generator 54 controls the timing at which the photodiode 51 outputs each pixel signal and the period during which the photodiode 51 accumulates received light. The timing generator 54 also controls the timing at which the AFE 52 is driven.

Referring to FIG. 3 again, the imaging apparatus 11 further includes a first subject luminance calculator 26, a first exposure controller 27, and a first image signal processor 28, which are all provided for the first imaging device 24. Similarly, the imaging apparatus 11 further includes a second subject luminance calculator 29, a second exposure controller 30, and a second image signal processor 31, which are all provided for the second imaging device 25.

The first subject luminance calculator 26 receives the output from the first imaging device 24 and divides the output, which is a first output image, into a predetermined number of sections. In the present embodiment, the first subject luminance calculator 26 divides the first output image into eight in an x direction and six in a y direction, 48 sections in total. The first output image is what is displayed as a live-view image.

The first subject luminance calculator 26 then calculates subject luminance information I1 on the luminance of each of the sections of the first output image produced by the first imaging device 24. The thus calculated subject luminance information I1 on luminance of each of the sections of the first output image is expressed in the form of subject luminance information $I1(i,j)$ (i=1 to 8, j=1 to 6). The calculated subject luminance information $I1(i,j)$ is supplied to the first exposure controller 27 and an exposure correction value calculator 32.

The first exposure controller 27 calculates an exposure value EV1 based on the subject luminance information I1 supplied from the first subject luminance calculator 26. The first exposure controller 27 then determines the aperture of the optical lens unit 21, the period during which the photodiode 51 in the first imaging device 24 accumulates light incident thereon, an amplification factor in the AFE 52, and other values based on the calculated exposure value EV1. The first exposure controller 27 controls the components described above based on the determined values.

The first image signal processor 28 performs predetermined image processing, for example, white balance adjustment and defective pixel interpolation, on the image signal carrying the first output image. The first image signal processor 28 then converts the image signal having undergone the image processing into, for example, an RGB (red, green, and blue) signal, which conforms to the input specifications of an electronic viewfinder 33 and a liquid crystal panel 33 and supplies the RGB signal to the electronic viewfinder 33 and the liquid crystal panel 34. The electronic viewfinder and the liquid crystal panel 33 display an image corresponding to the RGB signal (live-view image) supplied from the first image signal processor 28. A user (photographer) can look at the live-view image displayed on the electronic viewfinder 33 or the liquid crystal panel 34 and check the composition, the brightness and color tone of the image, and other parameters before capturing a still image.

To record live-view images as moving pictures, the first image signal processor 28 performs compression coding on the image signal having undergone the image processing based, for example, on MPEG (moving picture experts group) and supplies an image recorder 35 with the processed signal.

The second subject luminance calculator 29 receives the output from the second imaging device 25 and calculates subject luminance information I2 on the luminance of each section of a second output image, which is the output from the second imaging device 25. The number of divided sections of the second output image is equal to that of the first output image, and the subject luminance information I2 on the luminance of each of the sections is expressed in the form of subject luminance information I2 $(i,j)$, as in the case of the subject luminance information I1. The calculated subject luminance information I2 $(i,j)$ is supplied to the exposure correction value calculator 32.

The number of pixels of the second output image, which has undergone a thinning process, is set to be smaller than the number of pixels of a full-sized still image captured with the second imaging device 25. The reason for this is that the second output image is not recorded as a still image but is captured to make comparison of subject luminance information and therefore does not need to be a high-resolution image. The number of pixels of the second output image may, of course, be equal to the number of pixels of a still image to be captured.

The exposure correction value calculator 32 compares the subject luminance information I1 from the first subject luminance calculator 26 with the subject luminance information from the second subject luminance calculator 29 and calculates an exposure correction value deltaI, which is used to capture a still image with the second imaging device 25, based on the comparison result. The exposure correction value deltaI corrects a difference in exposure between the first imaging device 24 and the second imaging device 25 to prevent the brightness (luminance) of live-view images from being different from that of a still image when they are captured by using polarized incident light. The calculated exposure correction value deltaI, along with the subject luminance information I1 supplied from the first subject luminance calculator 26, is supplied to the second exposure controller 30.

The second exposure controller 30 calculates an exposure value EV2 based on the subject luminance information I1 and the exposure correction value deltaI from the exposure correction value calculator 32. More specifically, when the result of the comparison between live-view images and a still image to be captured shows that exposure correction is necessary for the still image, the exposure correction value calculator 32 supplies the subject luminance information I1 and the exposure correction value deltaI. The second exposure controller 30 adds the exposure correction value deltaI to the subject luminance information I1 to calculate corrected subject luminance information I2' (=I1+deltaI). The second exposure controller 30 calculates the exposure value EV2 based on the corrected subject luminance information I2'.

On the other hand, when the result of the comparison between live-view images and a still image to be captured shows that no exposure correction is necessary for the still image, the exposure correction value calculator 32 only supplies the subject luminance information I1. In this case, the second exposure controller 30 sets the subject luminance information I1 from the exposure correction value calculator 32 directly to be the subject luminance information I2' (=I1). The second exposure controller 30 then calculates the exposure value EV2 based on the subject luminance information I2'.

The second exposure controller 30 then determines the aperture of the optical lens unit 21, the period during which the photodiode 51 in the second imaging device 25 accumulates light incident thereon, the amplification factor in the AFE 52, the period during which the mechanical shutter 23 is open, and other values based on the calculated exposure value EV2. The second exposure controller 30 controls the components described above based the determined values.

When the result of the comparison between live-view images and a still image to be captured shows that no exposure correction is necessary for the still image, the second exposure controller 30 may alternatively acquire the subject luminance information I2 calculated by the second subject luminance calculator 29 and calculate the exposure value EV2 based on the subject luminance information I2.

When a release button (not shown) is pressed, the second imaging device 25 supplies the second image signal processor 31 with an image signal carrying an image to be recorded as a still image. The second image signal processor 31 performs predetermined image processing, for example, white balance adjustment and defective pixel interpolation, on the supplied image signal. The second image signal processor 31 then performs compression coding based, for example, on JPEG (joint photographic experts group) on the image signal carrying the still image having undergone the image processing and supplies the image recorder 35 with the processed signal.

The image recorder 35 records as a file the image signal supplied from the first image signal processor 28 or the second image signal processor 31 and coded based on a predetermined coding scheme, such as MPEG and JPEG, on a magnetic disk (hard disk), an optical disk, a magneto-optical disk, a semiconductor memory, or a predetermined recording medium. The image file recorded on a recording medium can be transferred to or copied on another apparatus via an input/output unit (not shown) or by unloading the recording medium, when it is removable.

Example of Target Object (Subject)

Figure 5:
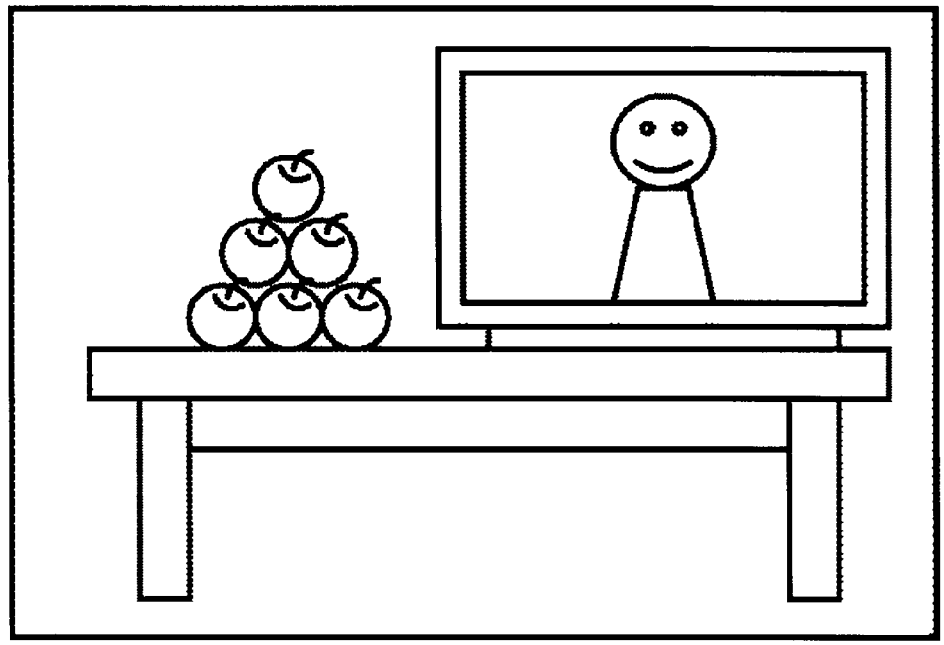
FIG. 5 shows an example of a target object.

FIG. 5 shows an example of a target object (subject) to be imaged with the imaging apparatus 11 in the present embodiment.

The imaging apparatus 11 captures an image of a subject formed of a table disposed in a room and fruits and a liquid crystal display apparatus (liquid crystal television receiver) placed on the table, as shown in FIG. 5. In this case, light incident from a liquid crystal screen of the liquid crystal display apparatus on the imaging apparatus 11 is polarized light. When the imaging apparatus 11 performs no exposure correction that prevents the brightness (luminance) of live-view images from being different from that of a still image, the region of the captured still image that corresponds to the liquid crystal screen is disadvantageously overexposed as compared with the live-view images, as shown in FIG. 2B.

Figure 6:
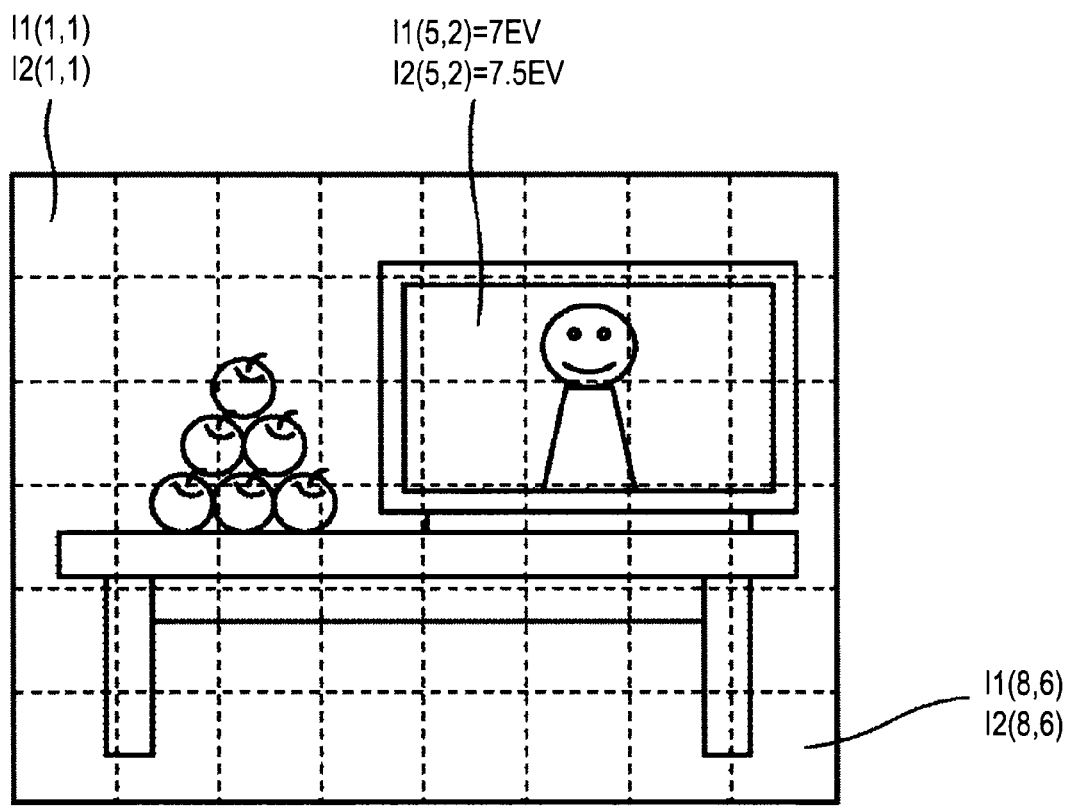
FIG. 6 describes an influence of polarization.

FIG. 6 shows the target object shown in FIG. 5 divided into eight in the x direction and six in the y direction, 48 sections in total.

For example, in a section (1,1), a section (8,6), and other sections outside the region corresponding to the liquid crystal screen, the subject luminance information I1 is equal to the subject luminance information I2. That is, the subject luminance information I1(1,1) is equal to the subject luminance information I2(1,1), and the subject luminance information I1(8,6) is equal to the subject luminance information I2(8,6).

In a section (5,2) within the region corresponding to the liquid crystal screen, however, the ratio of the amounts of light received by the two imaging devices, the first imaging device 24 and the second imaging device 25, is $1:\sqrt{2}$. For example, when the subject luminance information I1(5,2) is 7 EV, the subject luminance information I2(5,2) is 7.5 EV. As a result, if no exposure correction is performed, the region corresponding to the liquid crystal screen in a captured still image is overexposed as compared with live-view images.

Flowchart of Exposure Control

Figure 7:
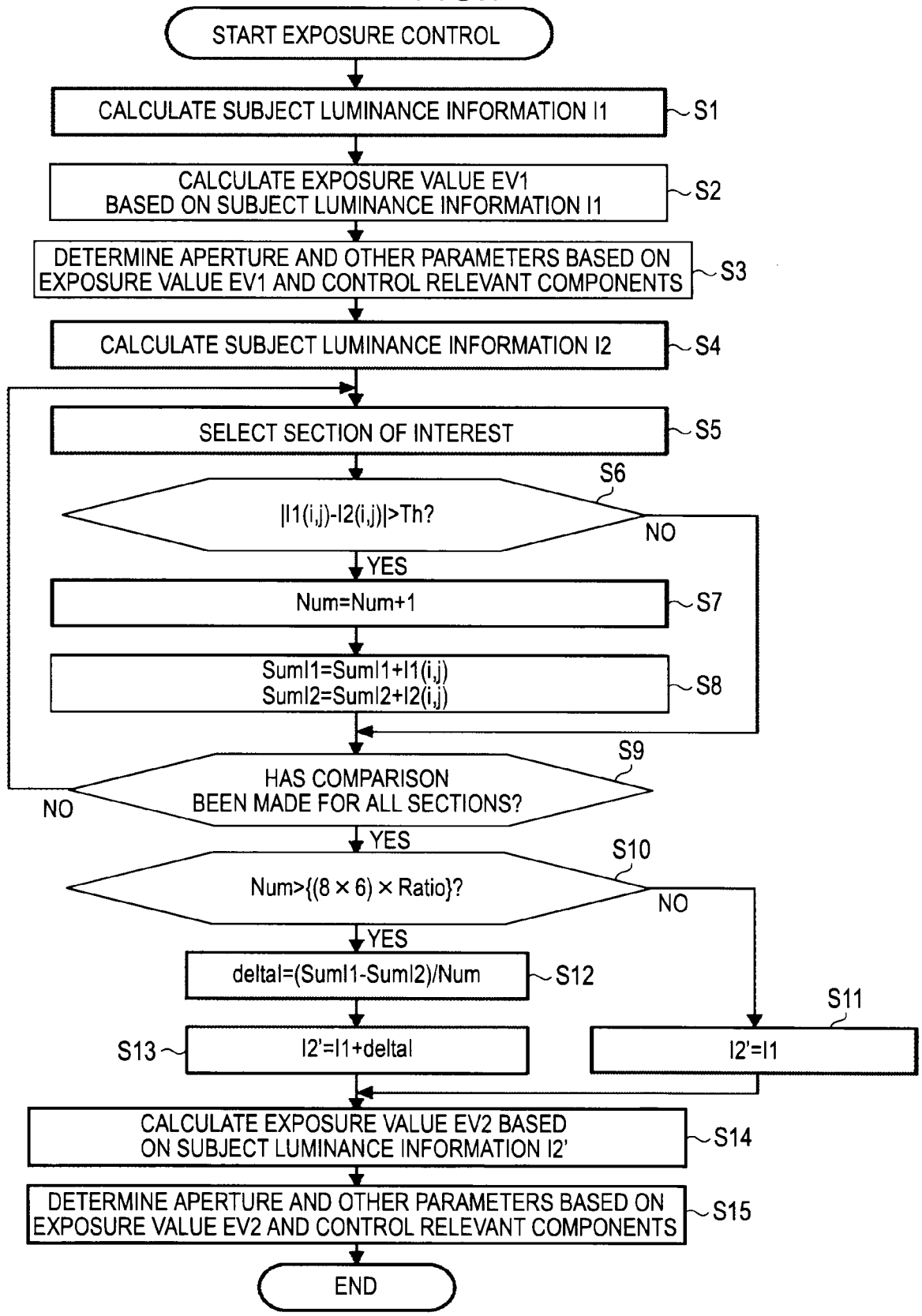
FIG. 7 is a flowchart describing exposure control performed by the imaging apparatus.

To address the problem, the imaging apparatus 11 performs exposure control shown in the flowchart of FIG. 7.

In the exposure control, the first subject luminance calculator 26 first calculates the subject luminance information I1 on the luminance of each section of a first output image captured with the first imaging device 24 in step S1. The subject luminance information I1($i,j$) calculated for each section is supplied to the first exposure controller 27 and the exposure correction value calculator 32.

In step S2, the first exposure controller 27 calculates the exposure value EV1 based on the subject luminance information I1 supplied from the first subject luminance calculator 26 and representing the luminance of the first output image.

In step S3, the first exposure controller 27 determines the aperture of the optical lens unit 21, the period during which the photodiode 51 in the first imaging device 24 accumulates light incident thereon, the amplification factor in the AFE 52, and other values based on the calculated exposure value EV1. The first exposure controller 27 controls these components based on the determined values.

In step S4, the second subject luminance calculator 29 calculates the subject luminance information I2 on the luminance of each section of a second output image captured with the second imaging device 25. The subject luminance information I2($i,j$) calculated for each section is supplied to the exposure correction value calculator 32.

In step S5, the exposure correction value calculator 32 selects one of the 48 divided sections as a section of interest. In other words, the exposure correction value calculator 32 determines the variables i and j that identify one of the 48 sections.

In step S6, the exposure correction value calculator 32 judges whether or not the absolute value of the difference between the subject luminance information I1($i,j$) and the subject luminance information I2($i,j$) on the luminance of the section of interest is greater than a predetermined threshold Th. That is, the exposure correction value calculator 32 judges whether or not there is a difference in brightness between the output image of the section of interest from the first imaging device 24 and that from the second imaging device 25. The absolute value of the difference between the subject luminance information I1($i,j$) and the subject luminance information I2($i,j$) becomes large when the light incident on the section of interest is polarized, whereas becoming small as the degree of polarization decreases. The predetermined threshold Th can, for example, be ⅛ EV.

When the judgment result in step S6 shows that the absolute value of the difference between the subject luminance information I1($i,j$) and the subject luminance information I2($i, j$) on the luminance of the section of interest is greater than the threshold Th, the control proceeds to step S7, and the exposure correction value calculator 32 adds one to a counter Num that counts the total number of sections where the difference in luminance has been judged to be greater than the threshold Th. It is noted that the counter Num is set at "zero" in an initial state.

In step S8, the exposure correction value calculator 32 performs computation for calculating the sum Sum of the luminance values of the sections where the difference in luminance has been judged to be large for each of the subject luminance information I1 and the subject luminance information I2. Specifically, the exposure correction value calculator 32 adds the subject luminance information I1($i,j$) on the luminance of the section of interest to the sum SumI1 of luminance values of the first output image and adds the subject luminance information I2($i,j$) on the luminance of the section of interest to the sum SumI2 of luminance values of the second output image. Each of the sum SumI1 and the sum SumI2 is set at "zero" in the initial state.

On the other hand, when the judgment result in step S6 shows that the absolute value of the difference between the subject luminance information I1($i,j$) and the subject luminance information I2($i,j$) on the luminance of the section of interest is smaller than or equal to the threshold Th, steps S7 and S8 described above are skipped.

In step S9, the exposure correction value calculator 32 judges whether or not the subject luminance information I1 has been compared with the subject luminance information I2 for all the sections.

When the judgment result in step S9 shows that the subject luminance information I1 has not been compared with the subject luminance information I2 for all the sections, the control returns to step S5 and the processes in steps S5 to S9 are repeated. That is, a predetermined section that has not been selected as the section of interest is selected as the section of interest, and the exposure correction value calculator 32 judges whether or not the absolute value of the difference between the subject luminance information $I1(i,j)$ and the subject luminance information $I2(i,j)$ is greater than the threshold Th.

On the other hand, when the judgment result in step S9 shows that the subject luminance information I1 has been compared with the subject luminance information I2 for all the sections, the control proceeds to step S10.

In step S10, the exposure correction value calculator 32 judges whether the total number Num of sections where the difference in luminance has been judged to be large is greater than the total number of sections (48=6×8) multiplied by a predetermined ratio Ratio. That is, the exposure correction value calculator 32 judges whether or not the area ratio of the sections where the difference in luminance has been judged to be large to the entire image is greater than the predetermined ratio Ratio. The predetermined ratio Ratio is desirably at least 0.5.

When the area ratio is smaller than or equal to the predetermined ratio Ratio, it is believed that the polarization will not greatly affect a still image to be captured and no exposure correction is necessary when a still image is captured with the second imaging device 25. On the other hand, when the area ratio is greater than the predetermined ratio Ratio, it is believed that the polarization will greatly affect a still image to be captured and exposure correction is necessary when a still image is captured with the second imaging device 25. The reason for this follows.

Figure 2A:
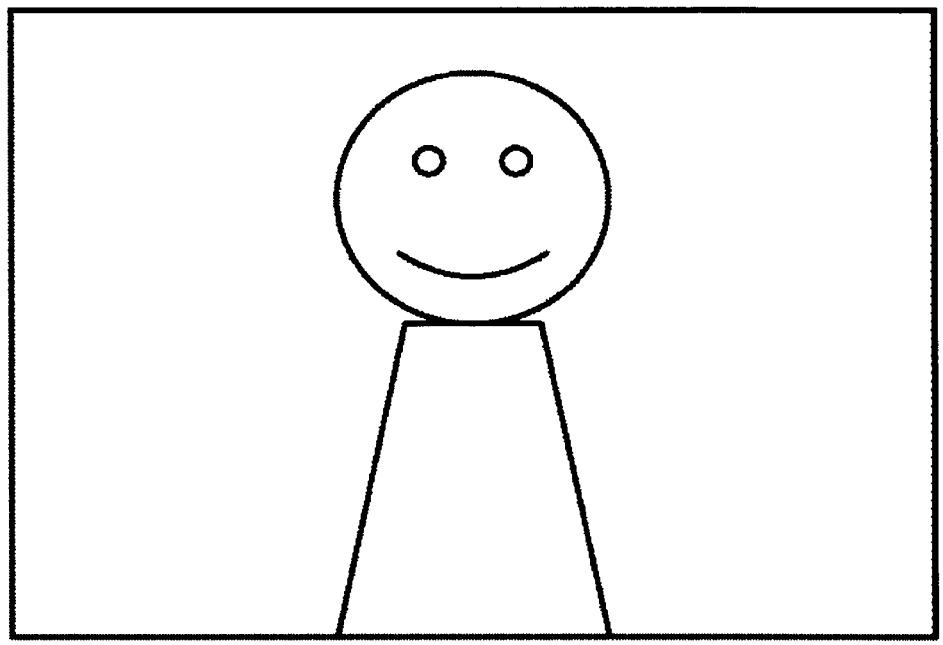
FIGS. 2A and 2B describe an influence of polarization.
Figure 2B:
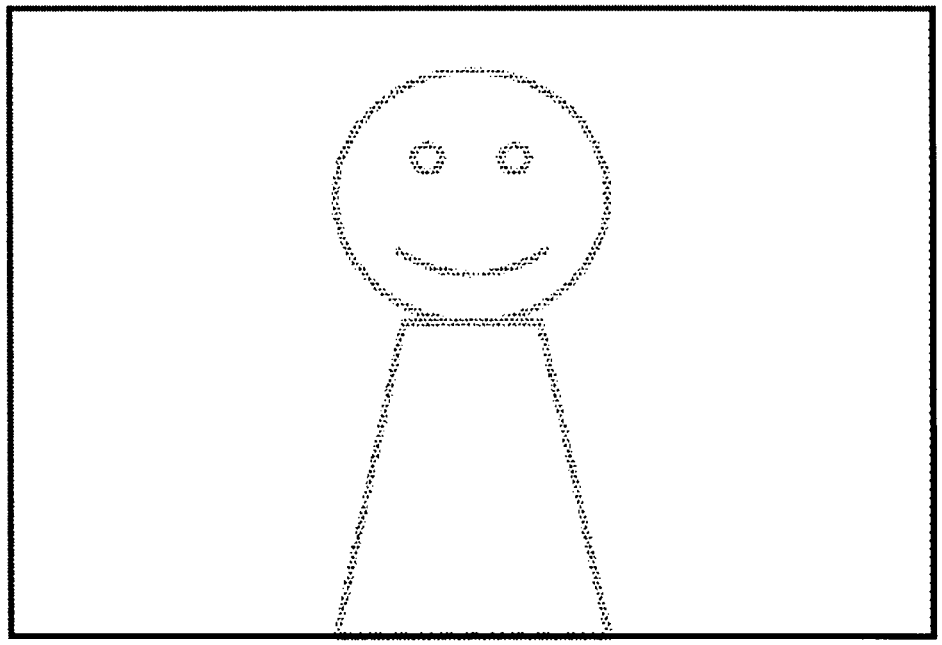

An example in which the area ratio is greater than the predetermined ratio Ratio is the case where the liquid crystal screen occupies the imaging range as shown in FIG. 2A. In this case, no exposure correction causes a captured still image to be overexposed, as described above.

Figure 8A:
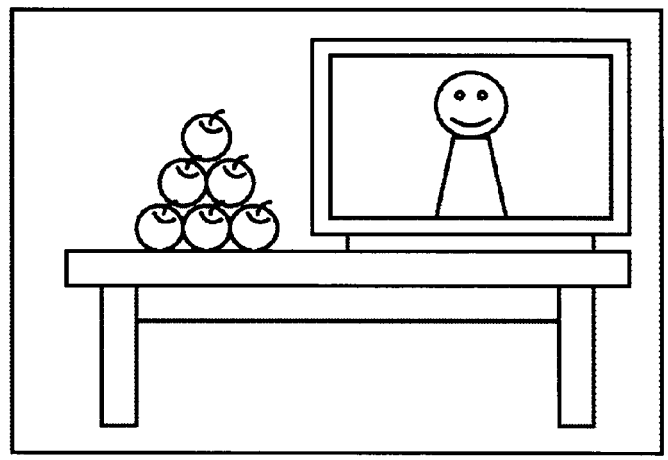
FIGS. 8A to 8C describe the exposure control performed by the imaging apparatus.
Figure 8B:
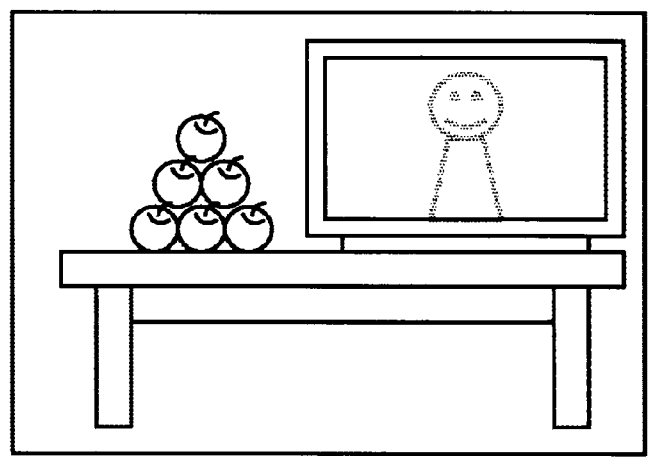
Figure 8C:
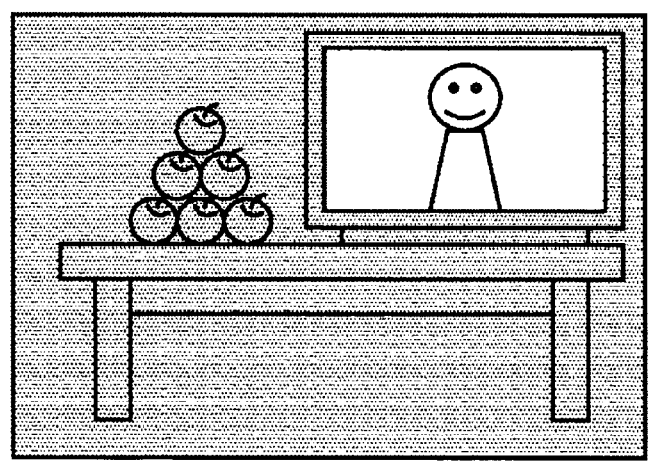

In contrast, for example, when the liquid crystal screen occupies only part of the imaging range and the area ratio is smaller than the predetermined ratio Ratio as shown in FIG. 8A, no exposure correction causes only the portion corresponding to the liquid crystal screen to be overexposed as shown in FIG. 8B, as in FIG. 2B. Performing exposure correction allows the portion corresponding to the liquid crystal screen to be adequately exposed but causes the other regions to be darker due to the exposure correction, as shown in FIG. 8C. That is, the portion corresponding to the liquid crystal screen is adequately exposed, whereas the other regions where images thereof are darker occupy relatively a large area. In this case, the viewer thinks that the portion corresponding to the liquid crystal screen is overexposed relative to the other regions and hence thinks that the image is not right. Therefore, when the area ratio of the sections where the difference in luminance has been judged to be large to the entire image is small, no exposure correction is preferably performed.

When the judgment result in step S10 shows that the area ratio of the sections where the difference in luminance has been judged to be large to the entire image is smaller than or equal to the predetermined ratio Ratio, the control proceeds to step S11 and the exposure correction value calculator 32 supplies the second exposure controller 30 with only the subject luminance information I1. The second exposure controller 30 then sets the subject luminance information I1 from the exposure correction value calculator 32 directly to be the corrected subject luminance information I2' (=I1).

On the other hand, when the judgment result in step S10 shows that the area ratio of the sections where the difference in luminance has been judged to be large to the entire image is greater than the predetermined ratio Ratio, the control proceeds to step S12 and the exposure correction value calculator 32 calculates the exposure correction value deltaI. Specifically, the exposure correction value calculator 32 calculates the average of the difference between the sums of the luminance values {deltaI=(SumI1−SumI2)/Num} to calculate the difference in luminance resulting from the polarization on a section basis and sets the result to be the exposure correction value deltaI.

The exposure correction value deltaI may alternatively be calculated in consideration of the area ratio of the sections where the difference in luminance has been judged to be large to the entire image {Num/(8×6)}. That is, the exposure correction value deltaI may be calculated by the expression deltaI={(SumI1−SumI2)/Num}×{Num/(8×6)}.

The thus calculated exposure correction value deltaI, along with the subject luminance information I1, is supplied to the second exposure controller 30.

In step S13, the second exposure controller 30 adds the exposure correction value deltaI to the subject luminance information I1, which have been provided from the exposure correction value calculator 32, to calculate the corrected subject luminance information I2' (=I1+deltaI).

In step S14, the second exposure controller 30 calculates the exposure value EV2 based on the subject luminance information I2'.

When the area ratio of the sections where the difference in luminance is large to the entire image is greater than the predetermined ratio Ratio and, in particular, polarization affects the entire sections, the second exposure controller 30 may acquire the subject luminance information I2 from the second subject luminance calculator 29 and calculate the exposure value EV2 based on the subject luminance information I2.

In step S15, the second exposure controller 30 determines the aperture of the optical lens unit 21, the period during which the photodiode 51 in the second imaging device 25 accumulates light incident thereon, the amplification factor in the AFE 52, the period during which the mechanical shutter 23 is open, and other values based on the calculated exposure value EV2. The second exposure controller 30 controls the components described above based on the determined values. The exposure control is then terminated.

As described above, according to the exposure control performed by the imaging apparatus 11, the subject luminance information is compared between corresponding ones of a plurality of divided sections. When polarization does not greatly affect the entire image, that is, when the area ratio of the sections where the difference in luminance is large to the entire sections is smaller than or equal to the predetermined ratio Ratio, the subject luminance information I1 from the exposure correction value calculator 32 is directly set to be the corrected subject luminance information I2' (=I1).

On the other hand, when polarization greatly affects the entire image, that is, when the area ratio of the sections where the difference in luminance is large to the entire sections is greater than the predetermined ratio Ratio, the value obtained by adding the exposure correction value deltaI to the subject luminance information I1 is set to be the corrected subject luminance information I2' (=I1+deltaI).

The difference in brightness between an image captured with the first imaging device 24 and an image captured with the second imaging device 25 is thus reduced when the incident light is polarized, whereby the photographer can capture a still image that hardly causes the photographer to think that the image is not right.

The imaging apparatus 11 divides output images into a plurality of sections, compares the difference in luminance between corresponding ones of the divided sections, and performs exposure correction when polarization greatly affects a still image to be captured. In this way, even when part of the entire imaging range shows a difference in luminance resulting from polarized incident light, the photographer can capture a still image that hardly causes the photographer to think that the image is not right.

In the calculation of the exposure value EV1 based on the subject luminance information I1 in the exposure control described above, the exposure value EV1 may be calculated based on the subject luminance information I1 on the luminance of a section outside the sections where the difference in luminance has been judged to be large. In this way, polarization affects the calculation of the exposure value EV1 by a smaller amount. In this case, the first exposure controller 27 needs to acquire from the exposure correction value calculator 32 either the absolute value itself of the difference between the subject luminance information $I1(i,j)$ and the subject luminance information $I2(i,j)$ on the luminance of each section or information for identifying sections where the difference in luminance is large.

In the example described above, the exposure value EV1 is calculated based on the subject luminance information I1. The exposure value EV1 may alternatively be calculated based on the subject luminance information I2 and the exposure correction value deltaI. In this case, the calculation procedure is as follows.

The subject luminance information I2 calculated by the second subject luminance calculator 29 is first supplied to the second exposure controller 30, which then calculates the exposure value EV2 based on the subject luminance information I2.

The subject luminance information I1 on the luminance of each section of the first output image captured with the first imaging device 24 is then calculated, and the exposure correction value deltaI is calculated by calculating the absolute value of the difference between the subject luminance information $I1(i,j)$ and the subject luminance information $I2(i,j)$ on the luminance of each section.

When the area ratio of the sections where the difference in luminance has been judged to be large to the entire image is greater than the predetermined ratio Ratio, the value obtained by adding the exposure correction value deltaI to the subject luminance information I2 is set to be corrected subject luminance information I1'(=I2+deltaI). When the area ratio of the sections where the difference in luminance has been judged to be large to the entire image is smaller than or equal to the predetermined ratio Ratio, the subject luminance information I2 is directly set to be the corrected subject luminance information I1'(=I2). The exposure value EV1 is then calculated based on the subject luminance information I1'.

The aperture of the optical lens unit 21 and other parameters are then determined based on the calculated exposure values EV1 and EV2, and the optical lens unit 21 and other relevant components are controlled based on the thus determined parameters, as described above.

Another Example of Threshold Th

In the procedure shown in FIG. 7, the threshold Th used in the process in step S6, in which whether or not the difference in luminance is large is judged, is fixed. The threshold Th may alternatively be changed adaptively in accordance with the luminance.

Figure 9:
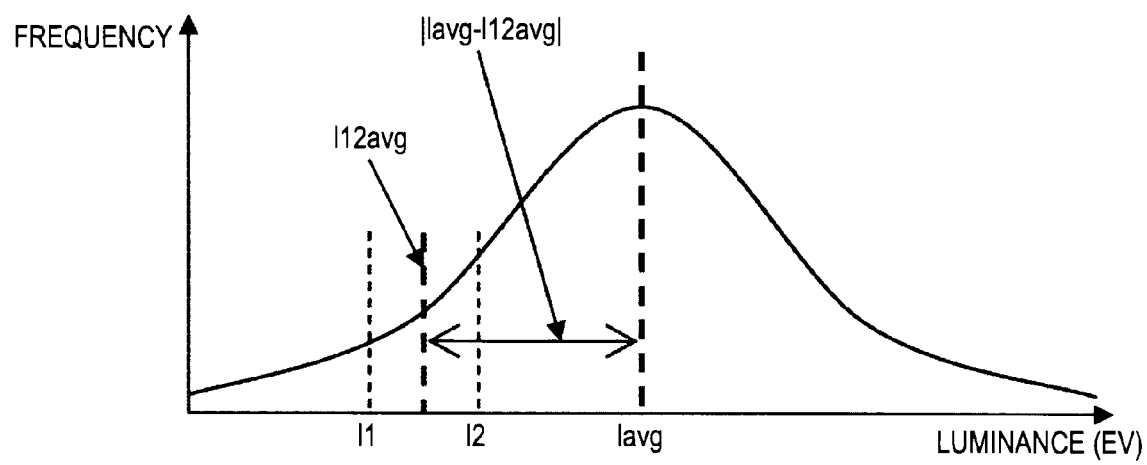
FIG. 9 describes another example of a threshold Th.

For example, it is believed that a photographer is likely to think that a captured still image is not right when the luminance values of most part of the output images, live-view images and the still image, greatly differ from each other. In view of this fact, when the subject luminance information I1 is so distributed that an intermediate luminance value coincides with an average Iavg and occurs most frequently as shown in FIG. 9, a section of interest having luminance closer to the average Iavg may be judged based on a lower threshold Th.

That is, the threshold Th can be determined based on the following expression.

$$Th=Th0+k\times|Iavg-I12avg|$$

where Th0 and k are predetermined constants, Iavg represents the average of the subject luminance information I1, and I12avg represents the average of the subject luminance information $I1(i,j)$ and the subject luminance information $I2(i,j)$ on the luminance of a section of interest $$(I12avg=(I1(i,j)+I2(i,j))/2).$$

In the example shown in FIG. 9, the thresholds for intermediate luminance values are set to be small values and hence the correction is likely to be performed, whereas no correction is proactively performed for low and high luminance values. Alternatively, Iavg may be the average of the subject luminance information I2 or the average of the subject luminance information I1 and the subject luminance information I2.

Figure 10:
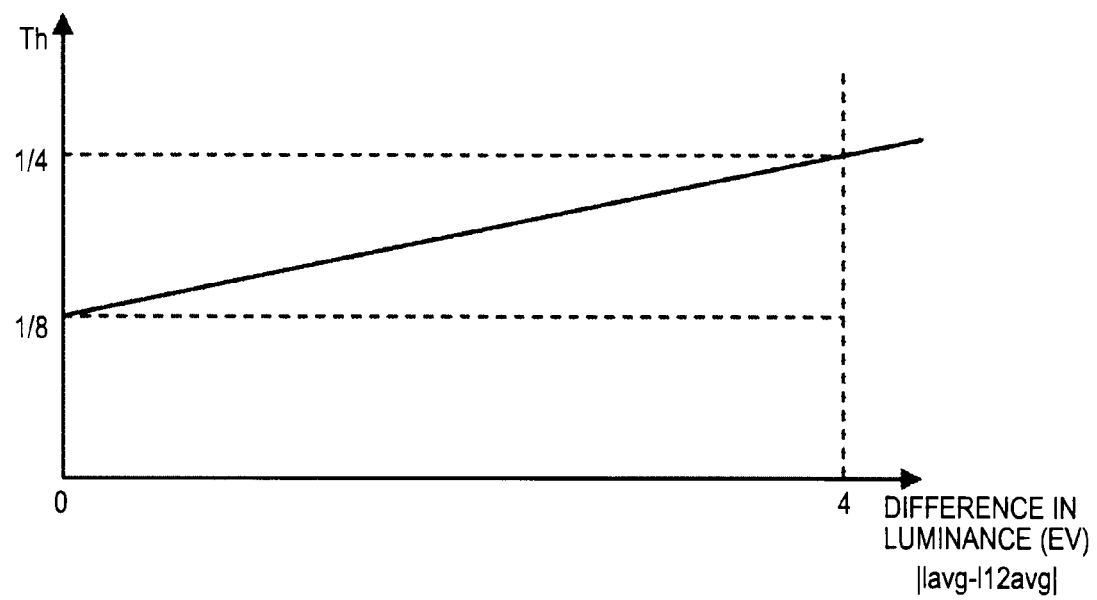
FIG. 10 describes the example of the threshold Th shown in FIG. 9.

For example, when Th0 and k are so set that Th0=⅛ and k=1/32, and the average I12avg of the luminance values of a section of interest is equal to the average Iavg of the subject luminance information I1, the threshold Th is equal to ⅛ and increases as the average I12avg deviates from the average Iavg, as shown in FIG. 10. When |Iavg−I12avg|=4, for example, the threshold Th is equal to ¼.

Further, the average luminance Iavg of the subject luminance information I1 does not agree with frequently occurring luminance in some cases. For example, a situation in which every luminance occurs at the same frequency is the case. In such a case, predetermined luminance corresponding to a scene mode in use, such as a landscape mode and a portrait mode, is used as a reference, which replaces the Iavg described above, and the threshold Th may be so changed that it decreases as the average I12avg approaches the reference.

Further, since it is believed that a photographer tends to look at the center of an image, the threshold Th may be set in accordance with the distance from the center of an image to a section of interest. In this case, the portion of the |Iavg−I12avg| described above is replaced with the distance between the center of an image and the center of a section of interest.

Example of Warning Display

In the process in step S6 shown in FIG. 7, when there is at least one section where the difference in luminance has been judged to be large, in other words, when a user (photographer) may think that a section of a captured still image differs from the corresponding section of live-view images, the imaging apparatus 11 may issue a warning to the user to notify that there is a noticeable difference.

Figure 11:
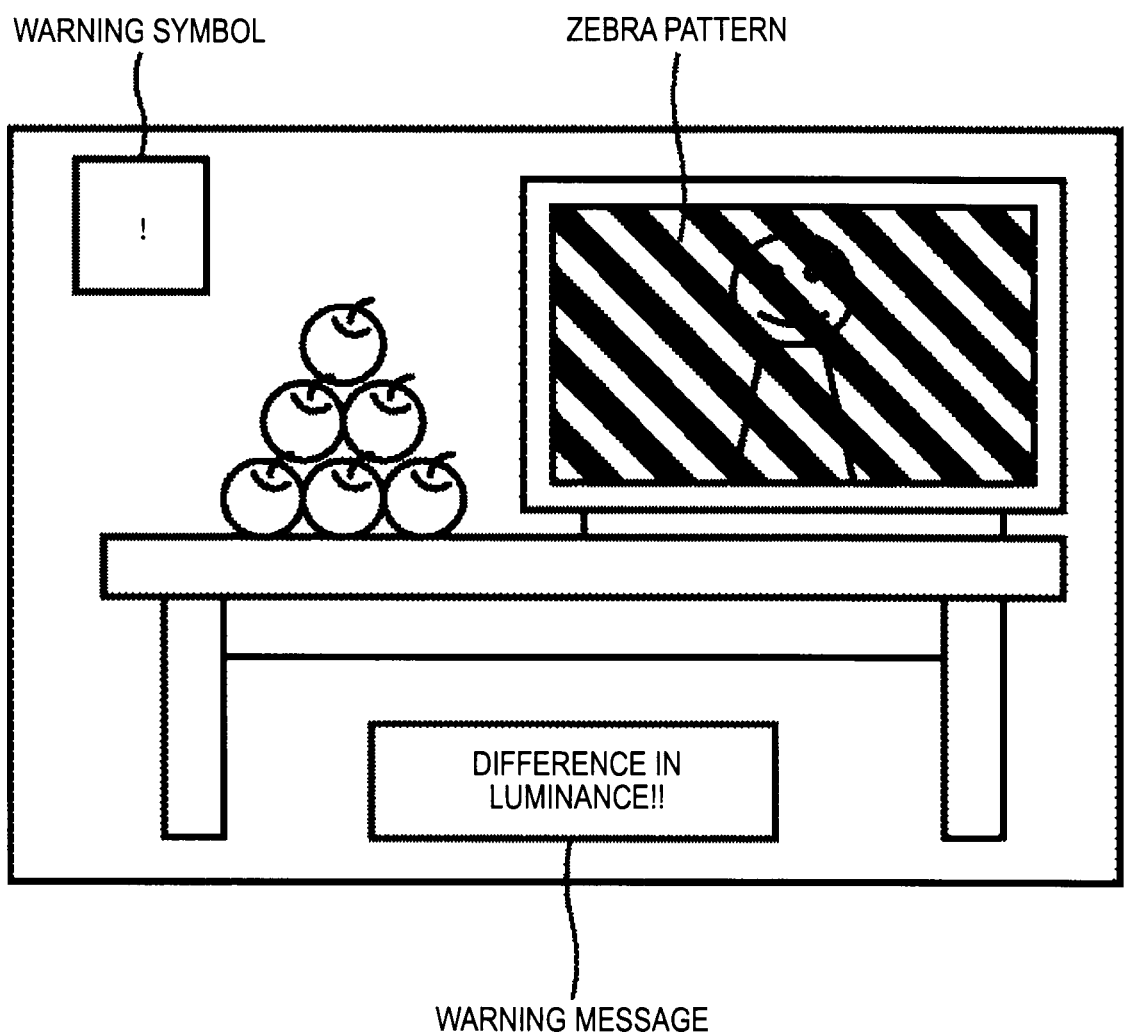
FIG. 11 shows examples of warning display.

FIG. 11 shows examples of the warning display.

A warning to be displayed can, for example, be a predetermined symbol (mark) or a message, such as "Difference in luminance!!," as shown in FIG. 11. Alternatively, the warning to be displayed may be a black-and-white zebra pattern displayed on a section where the difference in luminance has been judged to be large. To display a warning by changing the way a section where the difference in luminance has been judged to be large is displayed, a pattern other than the zebra pattern may be displayed, the luminance of a first output image may be reversed, or the first output image may be allowed to blink. Still alternatively, a warning based on a visual output may be replaced with a warning based on an audio output, such as "Difference in luminance! !" or a predetermined sound.

After issuing a warning, the imaging apparatus 11 allows the user to choose whether or not the exposure correction is performed. Alternatively, the imaging apparatus 11 may allow the user to specify whether or not the exposure correction is performed, for example, through an action setting screen and perform (or not perform) the exposure correction based on information set through the action setting screen as well as displaying a warning.

Another Example of Exposure Control

Another example of the exposure control will be described.

In the exposure control described above, increasing the number of divided sections allows the difference in luminance to be computed on a small area basis and hence the computed difference to be precise. Simply increasing the number of divided sections, however, increases the computation load and period accordingly.

Figure 12:
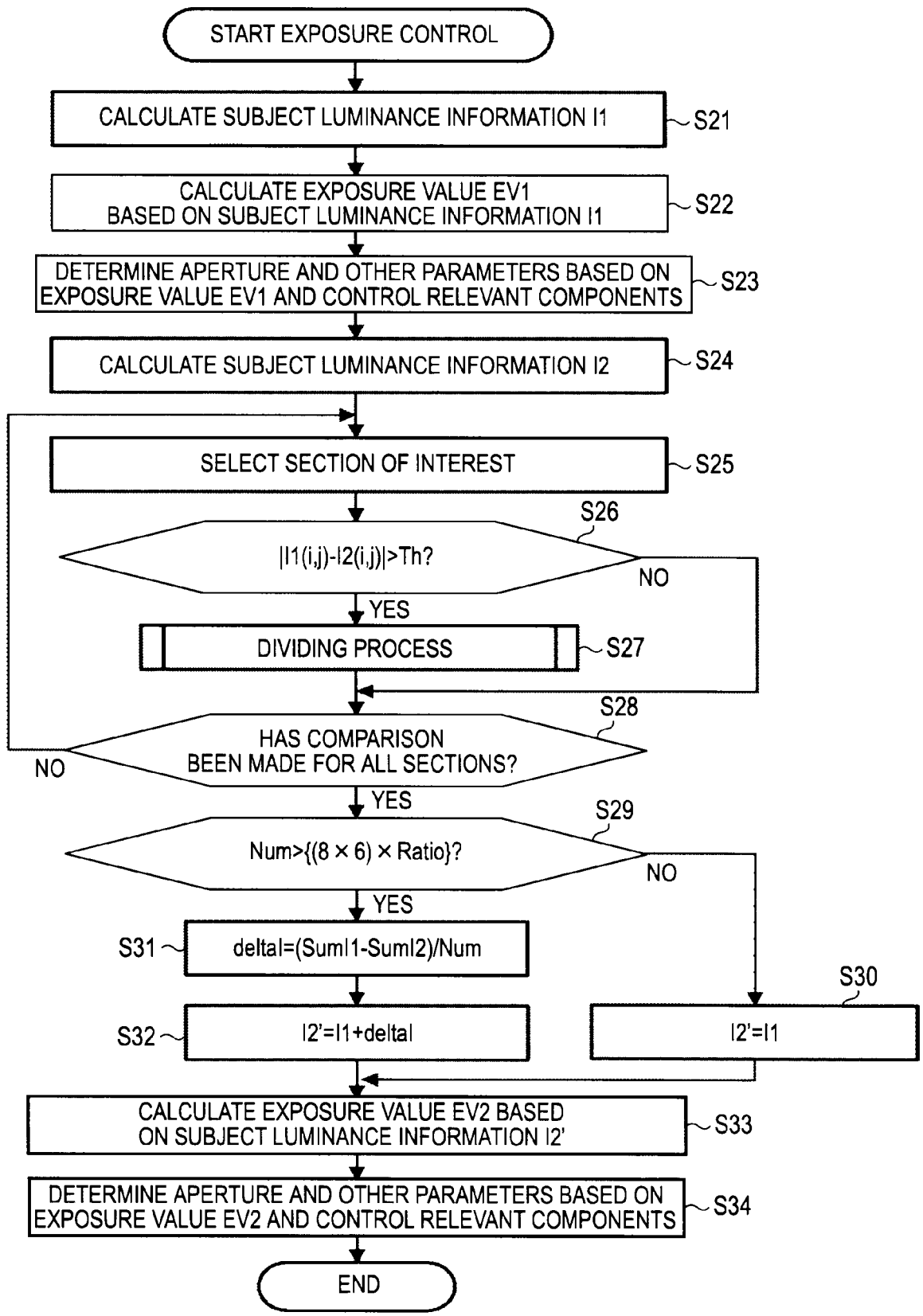
FIG. 12 is a flowchart describing another example of the exposure control performed by the imaging apparatus.

In view of this fact, the imaging apparatus 11 may perform exposure control shown in the flowchart of FIG. 12.

In the exposure control shown in FIG. 12, a dividing process in step S27 replaces the processes in steps S7 and S8 in FIG. 7, and the other steps are the same as those in the exposure control shown in FIG. 7. No description will therefore be made of the processes other than that in step S27.

In the exposure control shown in FIG. 12, when the absolute value of the difference between the subject luminance information $I1(i,j)$ and the subject luminance information $I2(i,j)$ on the luminance of a section of interest is judged to be greater than the threshold Th, the section of interest is further divided into a plurality of smaller sections, and the subject luminance information is compared between corresponding divided sections.

That is, when the judgment result in step S26 shows that the absolute value of the difference between the subject luminance information $I1(i,j)$ and the subject luminance information $I2(i,j)$ on the luminance of a section of interest is judged to be greater than the threshold Th, the section of interest is divided in step S27.

In the dividing process, how many smaller sections the section of interest is divided into is determined in advance. It is assumed in the present embodiment that the section of interest is divided into 4 (=2×2) smaller sections.

Figure 13:
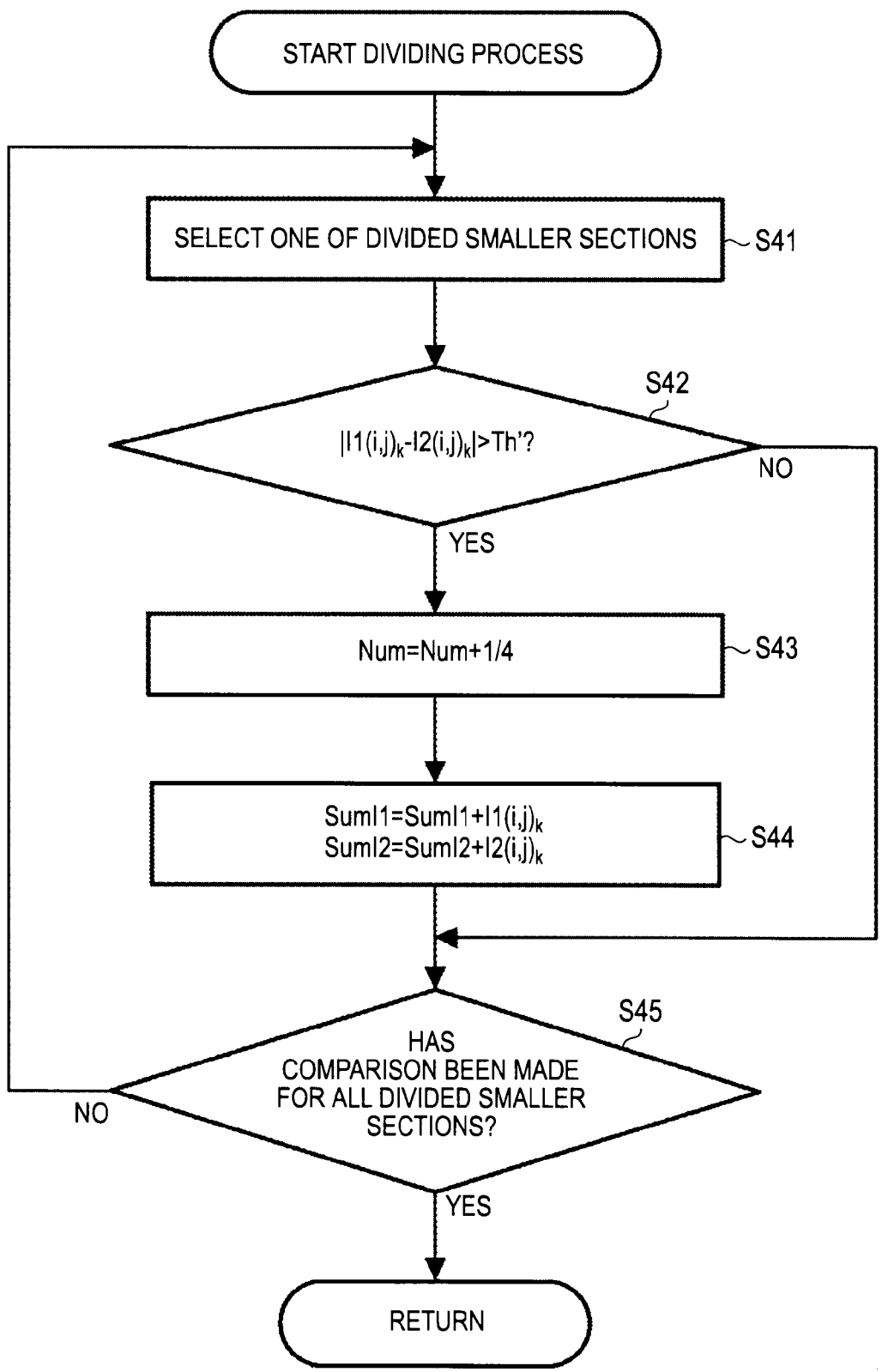
FIG. 13 is a flowchart describing a dividing process in detail.

FIG. 13 is a flowchart showing the dividing process in step S27 in detail.

In the dividing process, in a first step S41, the exposure correction value calculator 32 selects one of the four divided smaller sections, which have been obtained by dividing the section of interest.

In step S42, the exposure correction value calculator 32 judges whether or not the difference in luminance between the corresponding selected divided smaller sections is greater than a predetermined threshold Th'. That is, let $(i,j)_k$ (k is one of the values ranging from one to four) be one of the four divided smaller sections, which have been obtained by dividing the section of interest, and the exposure correction value calculator 32 judges whether or not the absolute value of the difference between the subject luminance information $I1(i,j)_k$ and the subject luminance information $I2(i,j)_k$ is greater than the predetermined threshold Th'. The threshold Th' may be equal to the threshold Th in step S26 or may preferably be greater than the threshold Th.

When the judgment result in step S42 shows that the difference in luminance between the corresponding selected divided smaller sections is greater than the threshold Th', the processes in steps S43 and S44 are carried out, whereas when the judgment result in step S42 shows that the difference in luminance is smaller than or equal the threshold Th', the processes in steps S43 and S44 are skipped. The processes in steps S43 and S44, which are performed on the corresponding selected divided smaller sections, correspond to the processes in steps S7 and S8 in FIG. 7.

That is, in step S43, the exposure correction value calculator 32 adds ¼, which represents corresponding selected divided smaller sections, to the counter Num for counting the total number of sections where the difference in luminance has been judged to be large.

In step S44, the exposure correction value calculator 32 adds the subject luminance information $I1(i,j)_k$ on the luminance of the selected divided smaller section to the sum SumI1 of the luminance values of the first output image and adds the subject luminance information $I2(i,j)_k$ on the luminance of the selected divided smaller section to the sum SumI2 of the luminance values of the second output image.

In step S45, the exposure correction value calculator 32 judges whether the comparison between the subject luminance information I1 and the subject luminance information I2 has been made for all the divided smaller sections.

When the judgment result in step S45 shows that the comparison between the subject luminance information I1 and the subject luminance information I2 has not been made for all the divided smaller sections, the control returns to step S41 and the processes in steps S41 to S45 are repeated. That is, the exposure correction value calculator 32 judges whether the difference in luminance between divided smaller sections in the section of interest that have not been selected is greater than the threshold Th'.

On the other hand, when the judgment result in step S45 shows that the comparison between the subject luminance information I1 and the subject luminance information I2 has been made for all the divided smaller sections, the control returns to the procedure shown in FIG. 12 and proceeds to the following step S28.

Figure 14:
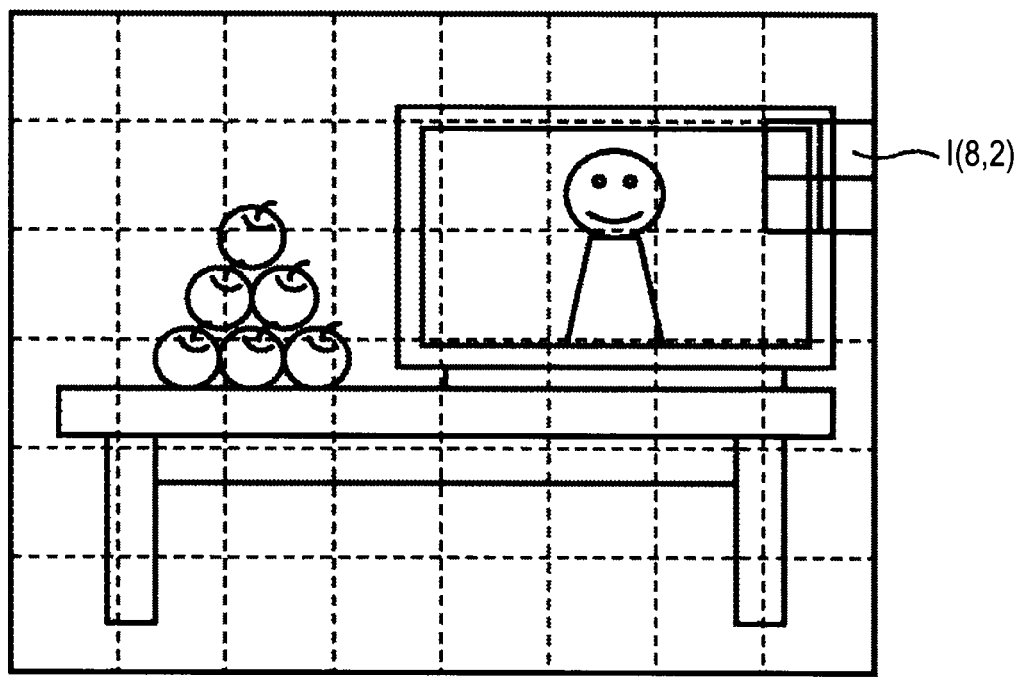
FIG. 14 describes divided smaller sections.

Carrying out the processes described above allows more precise detection of a section containing both a region that involves polarized light and a region that does not involve polarized light and producing a difference in luminance, for example, a section I(8,2) shown in FIG. 14. Since the number of division is determined in advance, the amount of computation will not greatly increase as long as luminance values of the divided smaller sections are also stored in the process in step S26 (computation of difference in luminance on a section-of-interest basis). The amount of data can be smaller than in a case where each section is simply divided into smaller sections, whereby the computation period can be shortened and the memory capacity can be reduced.

When the judgment result in step S42 shows that corresponding selected divided smaller sections show a difference in luminance, the divided smaller sections can be further divided into a certain number of sub-sections, and the processes in steps S43 and S44 can be carried out on a divided sub-section basis. That is, further dividing only a section where there is a difference in luminance allows the section where there is a difference in luminance to be detected more precisely.

In the exposure control described above, the photometric measurement for determining the subject luminance information I2 associated with the second imaging device 25 does not affect a still image to be outputted. The number of pixels of the second output image for determining the subject luminance information I2 may therefore be smaller than that of a captured still image by performing pixel thinning or local region extraction as appropriate. For example, the number of pixels of the second output image can be equal to that of the first output image. The power consumption can therefore be reduced. The power consumption may further be reduced by lowering the frame rate at which the second output image is captured. The same thing, of course, holds true for the first imaging device 24, that is, the pixel thinning, the local region extraction, and frame rate changing may be employed. Further, the photometric measurement by using the second imaging device 25 is not necessarily performed continuously but can be performed only immediately before a still image is captured, whereby the power consumption can be further reduced.

The series of processes described above can be carried out by either hardware or software. To carry out the series of processes by software, a program containing the software is installed in a computer. The computer may be a computer incorporated into dedicated hardware, a general-purpose personal computer capable of performing a variety of functions by installing a variety of programs, or any other suitable computer.

Figure 15:
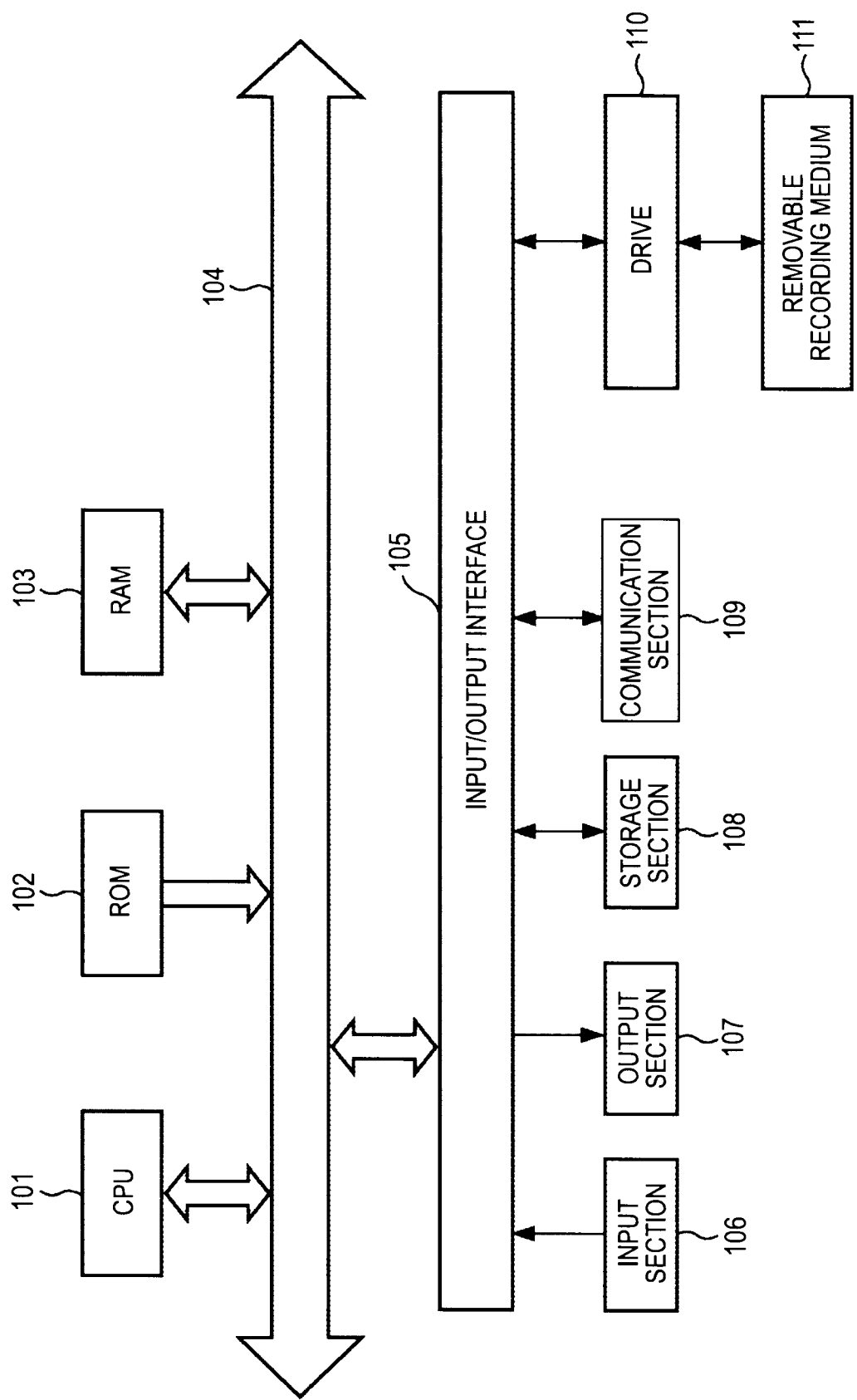
FIG. 15 is a block diagram showing an example of the configuration of a computer according to an embodiment to which the present technique is applied.

FIG. 15 is a block diagram showing an example of the configuration of the hardware of a computer that uses a program to carry out the series of processes described above.

In the computer, a CPU (central processing unit) 101, a ROM (read only memory) 102, a RAM (random access memory) 103 are interconnected via a bus 104.

An input/output interface 105 is also connected to the bus 104. An input section 106, an output section 107, a storage section 108, a communication section 109, and a drive 110 are connected to the input/output interface 105.

The input section 106 is formed, for example, of a keyboard, a mouse, and a microphone. The output section 107 is formed, for example, of a display and a loudspeaker. The storage section 108 is formed, for example, of a hard disk drive and a non-volatile memory. The communication section 109 is formed, for example, of a network interface. The drive 110 drives a removable recording medium 111, such as a magnetic disk, an optical disk, a magneto-optical disk, and a semiconductor memory.

In the thus configured computer, the CPU 101, for example, loads a program stored in the storage section 108 into the RAM 103 via the input/output interface 105 and the bus 104 and executes the program to carry out the series of processes described above.

In the computer, the program can be installed in the storage section 108 via the input/output interface 105 by loading the removable recording medium 111 into the drive 110. The program can alternatively be installed in the storage section 108 by receiving it through the communication section 109 via a wired or wireless transmission medium, such as a local area network, the Internet, and digital satellite broadcasting. Still alternatively, the program can be installed in advance in the ROM 102 or the storage section 108.

The steps described in the flowcharts in the present specification may be, but not necessarily, carried out successively in the time sequence in the described order or may be carried out concurrently, or each of the steps may be carried out at a necessary timing, for example, when the step is called.

Embodiments of the present technique are not limited to those described above, but a variety of changes can be made thereto to the extent that they do not depart from the substance of the present technique.

The present disclosure contains subject matter related to that disclosed in Japanese Priority Patent Application JP 2011-014939 filed in the Japan Patent Office on Jan. 27, 2011, the entire content of which is hereby incorporated by reference.

What is claimed is:

1. An imaging apparatus comprising:
   a half-silvered mirror that divides incident light from a subject into light fluxes traveling along two optical paths;
   a first imaging device that receives one of the incident light fluxes divided by the half-silvered mirror;
   a second imaging device that receives the other one of the incident light fluxes divided by the half-silvered mirror;
   circuitry configured to
      calculate first subject luminance information based on an output from the first imaging device,
      calculate second subject luminance information based on an output from the second imaging device, and
      compare the first subject luminance information with the second subject luminance information.

2. The imaging apparatus according to claim 1,
   wherein the circuitry is further configured to calculate an exposure correction value for correcting a difference in output between the first imaging device and the second imaging device based on a result of the comparison between the first subject luminance information and the second subject luminance information.

3. The imaging apparatus according to claim 1, wherein
   the output from each of the first and second imaging devices is divided into a plurality of sections, and
   the circuitry is further configured to
      calculate the first subject luminance information for each of the sections from the first imaging device,
      calculate the second subject luminance information for each of the sections from the second imaging device, and
      compare the first subject luminance information with the second subject luminance information between corresponding ones of the sections.

4. The imaging apparatus according to claim 3,
   wherein the circuitry is further configured to calculate an exposure correction value for correcting a difference in output between the first and second imaging devices when an area ratio of sections where the difference in luminance is large to the entire sections is greater than a predetermined ratio.

5. The imaging apparatus according to claim 3,
   wherein the circuitry is further configured to calculate an exposure value used when an image is captured with the first imaging device, the exposure value calculated by using the first subject luminance information on the luminance of a section other than the sections where the difference between the first subject luminance information and the second subject luminance information is large.

6. The imaging apparatus according to claim 3, wherein
the circuitry is further configured to compare the difference between the first subject luminance information and the second subject luminance information on the luminance of corresponding ones of the sections with a predetermined threshold, and
the predetermined threshold is adaptively changed in accordance with the first or second subject luminance information.

7. The imaging apparatus according to claim 3, wherein the circuitry is further configured to
divide a section where the difference between the first subject luminance information and the second subject luminance information is judged to be large into a plurality of smaller sections, and
compare the first subject luminance information and the second subject luminance information on the luminance of corresponding ones of the divided smaller sections with each other.

8. The imaging apparatus according to claim 3,
wherein the circuitry is further configured to issue a warning when a result of the comparison between the first subject luminance information and the second subject luminance information shows that at least part of the sections has a difference between the first subject luminance information and the second subject luminance information.

9. The imaging apparatus according to claim 1,
wherein at least one of the outputs from the first and second imaging devices undergoes thinning.

10. The imaging apparatus according to claim 1,
wherein the first imaging device is used to display live-view images, and
the second imaging device is used to capture a still image.

11. The imaging apparatus according to claim 10,
wherein the second imaging device provides an output for comparing the first subject luminance information with the second subject luminance information only immediately before the still image is captured.

12. An imaging control method used with an imaging apparatus including a half-silvered mirror that divides incident light from a subject into light fluxes traveling along two optical paths, a first imaging device that receives one of the incident light fluxes divided by the half-silvered mirror, and a second imaging device that receives the other one of the incident light fluxes divided by the half-silvered mirror, the method comprising:
calculating first subject luminance information based on an output from the first imaging device by using a first subject luminance information calculator;
calculating second subject luminance information based on an output from the second imaging device by using a second subject luminance information calculator; and
comparing the first subject luminance information with the second subject luminance information by using a subject luminance information comparator.

13. A non-transitory computer-readable storage medium storing a program that instructs a computer to:
calculate first subject luminance information based on an output from a first imaging device that receives part of incident light from a subject, the incident light being divided by a half-silvered mirror into light fluxes traveling along two optical paths and the part of the incident light being one of the divided incident light fluxes;
calculate second subject luminance information based on an output from a second imaging device that receives the other one of the divided incident light fluxes; and
compare the first subject luminance information with the second subject luminance information.

* * * * *